April 29, 1941.  P. KOLLSMAN ET AL  2,239,790
REMOTE INDICATOR
Filed Feb. 10, 1938  4 Sheets-Sheet 1
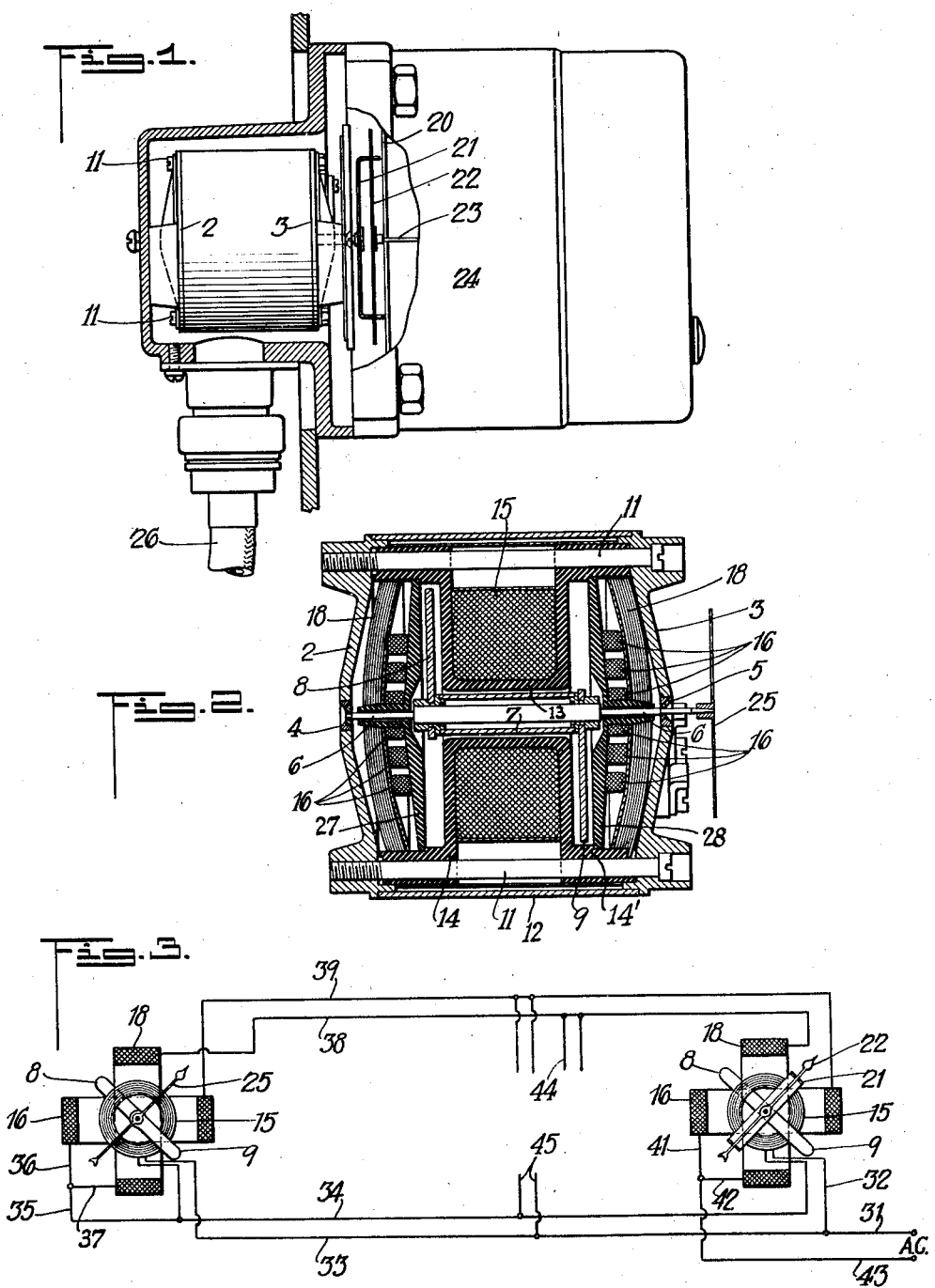
INVENTORS.
PAUL KOLLSMAN,
VICTOR E. CARBONARA.
BY
ATTORNEY April 29, 1941.  P. KOLLSMAN ET AL  2,239,790
REMOTE INDICATOR
Filed Feb. 10, 1938   4 Sheets-Sheet 2
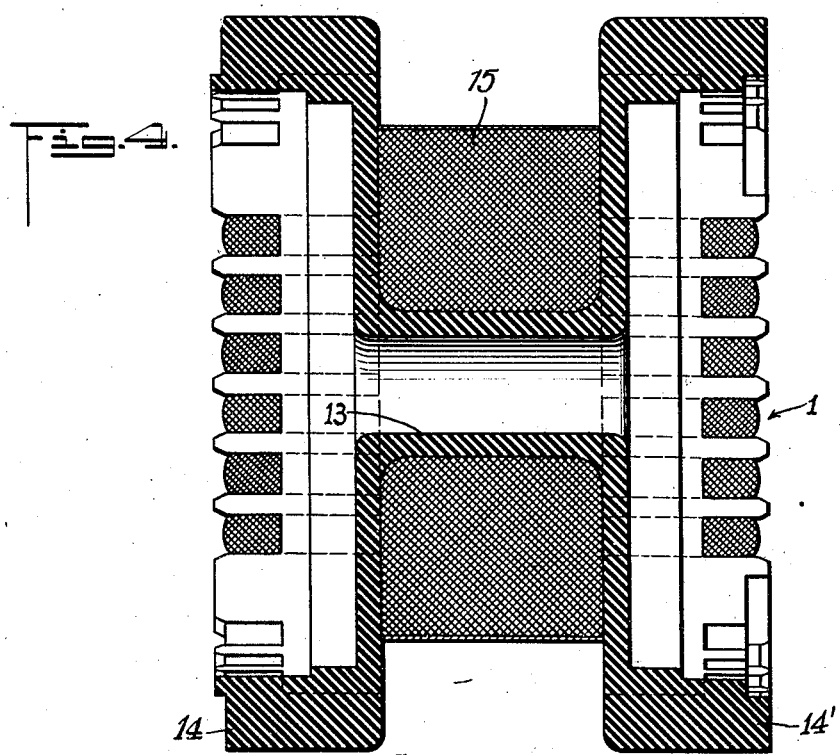
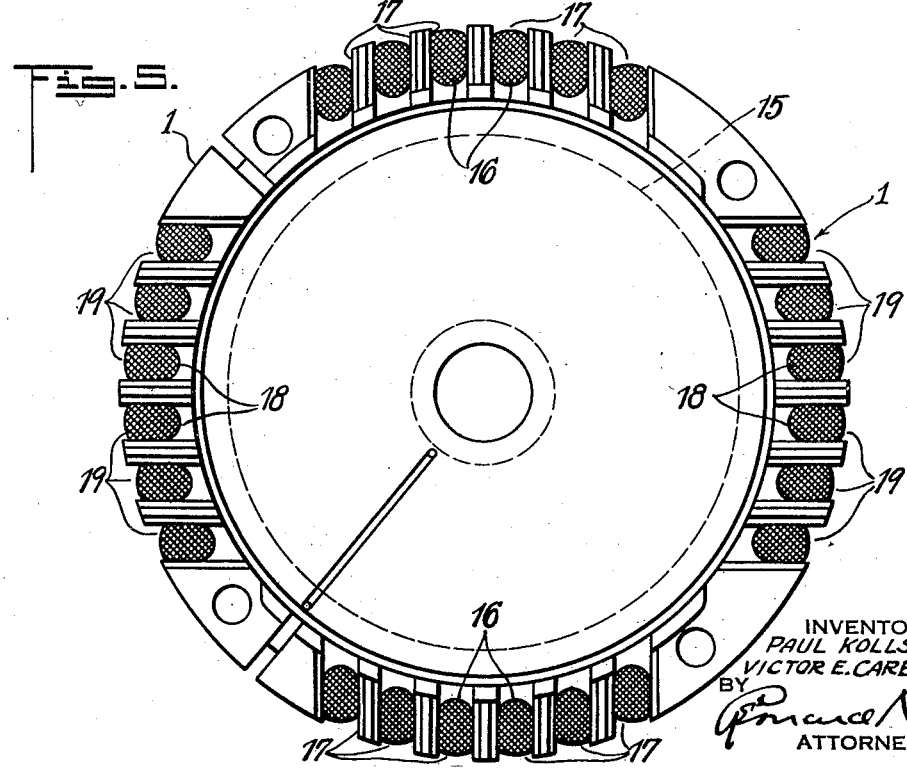
INVENTORS.—
PAUL KOLLSMAN,
VICTOR E. CARBONARA.
BY
ATTORNEY

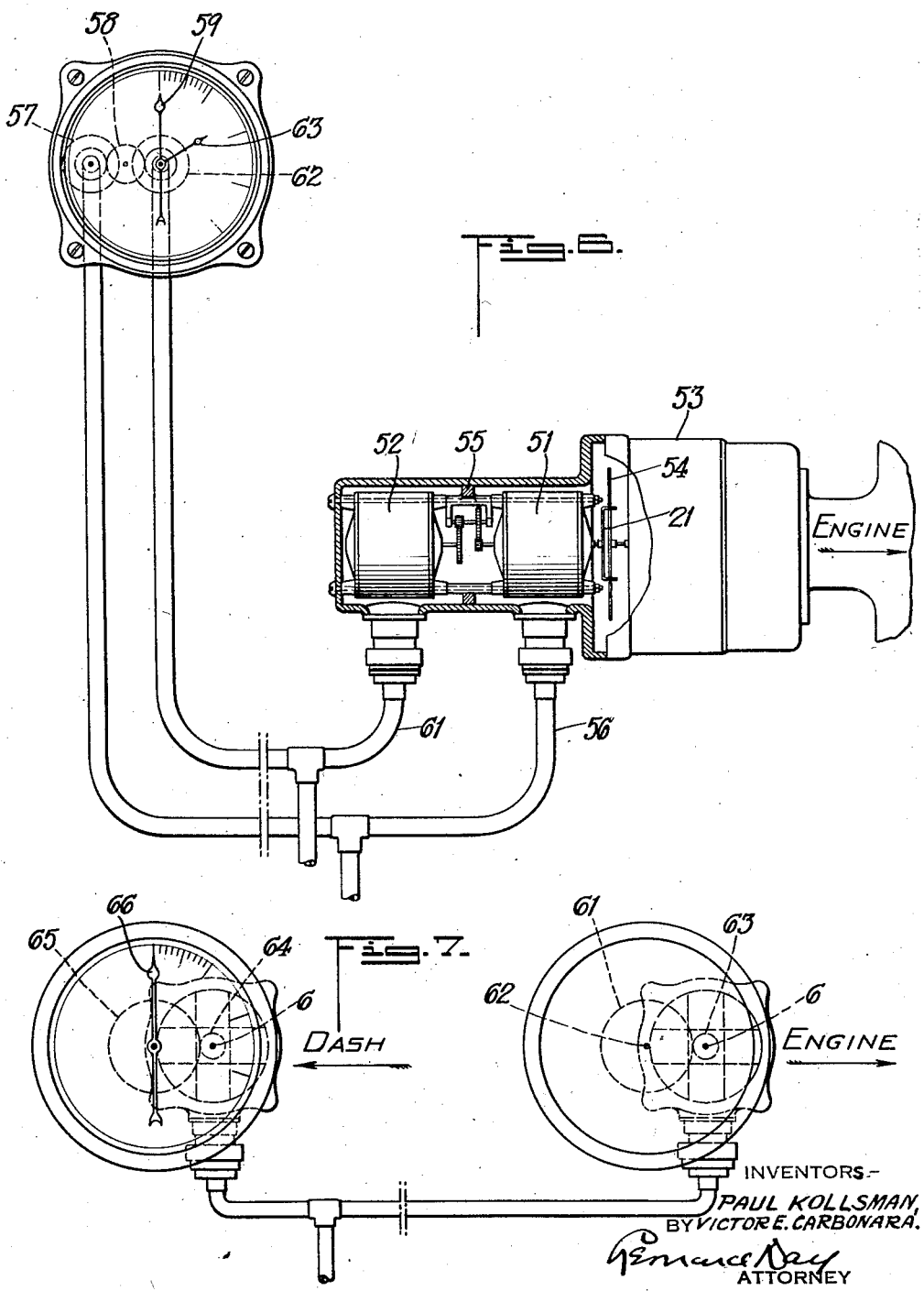

April 29, 1941.  P. KOLLSMAN ET AL  2,239,790
REMOTE INDICATOR
Filed Feb. 10, 1938  4 Sheets-Sheet 4
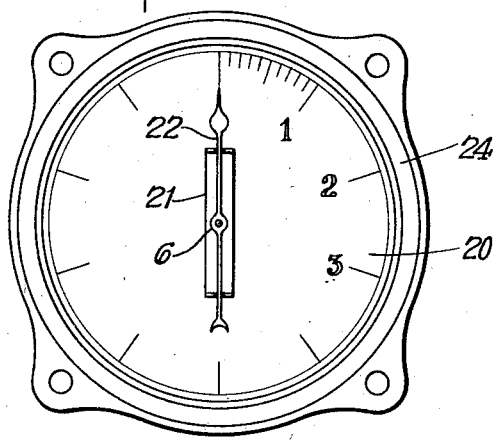
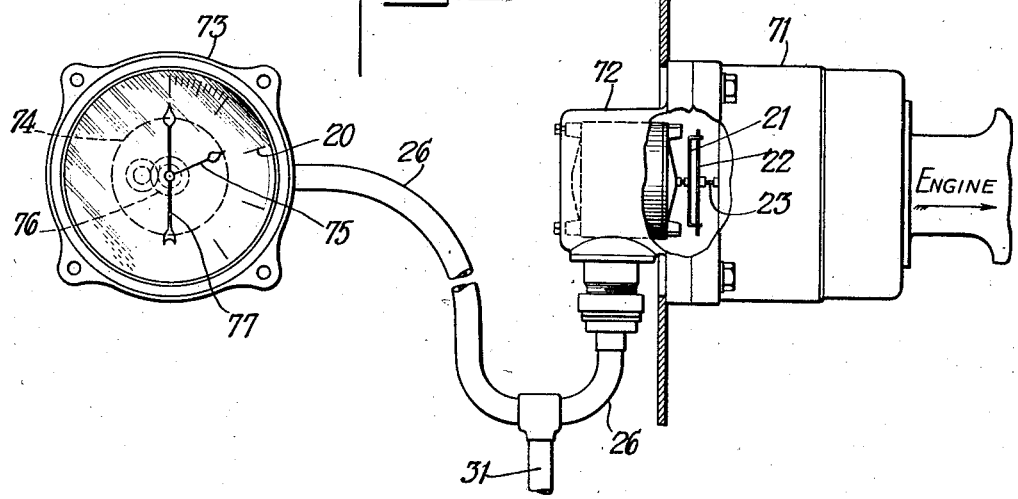
INVENTORS.—
PAUL KOLLSMAN,
VICTOR E. CARBONARA.
BY
ATTORNEY Patented Apr. 29, 1941

2,239,790

UNITED STATES PATENT OFFICE 2,239,790

REMOTE INDICATOR

Paul Kollsman, Stamford, Conn., and Victor E. Carbonara, Rockville Centre, N. Y., assignors, by mesne assignments, to Square D Company, Detroit, Mich., a corporation of Michigan Application February 10, 1938, Serial No. 189,816

6 Claims. (Cl. 172—36)

This invention relates to indicating instruments, and particularly to means for conveying the reading of an indicating instrument to a remote point; and it relates especially to a simple electro-magnetic mechanism adapted to be attached to an indicating instrument, to be actuated by the pointer of the indicating instrument and to reproduce the indications of the pointer at a place remote from the locus of the indicating instrument.

In the utilization of indicating instruments it has been found desirable in many instances to have the reading of instrument immediately available at a point remote from the most satisfactory location of the indicating instrument, and various attempts have been made to obtain this result, utilizing such structures as flexible shafts for conveying the motion; or by the use of auxiliary instruments connected to the same measurable energy channel the characteristics of which are to be measured; or by the use of various types of electro-magnetic transfer mechanisms. None of these devices has proven satisfactory, especially in connection with airplane instruments, because of the power required when mechanical transfer means or auxiliary instruments are utilized; because of the weight and complexity of the various structures proposed; and because of the low accuracy of repetition of the instrument reading.

The present invention provides an improved electro-magnetic conveyor mechanism which requires for its operation only a minimum of power; which is simple, light and inexpensive and which has a high degree of accuracy of repetition.

The device utilizes a plurality of substantially identical transmitter and repeater members, each comprising three coils energized by alternating current and a movable vane system, one being connected to move with the pointer whose position is to be transferred, and another being adapted to carry a pointer to indicate the position of the instrument pointer.

Thus, an object of the invention is to reproduce the reading of an instrument at a remote point.

Another object of the invention is to move the spindle of an electro-magnetic member and to cause an equal and similar movement of one or more other spindles electrically connected thereto.

Still another object of the invention is to produce an alternating field adjacent a moving vane system and to influence a plurality of coils thereby for the generation of corresponding currents therein; and to cause another vane system to position itself correspondingly under the influence of currents developed in corresponding coils.

Still another object of the invention is to wind a plurality of high impedance coils in quadrature upon a light, non-magnetic insulating frame.

Still another object is to convey simultaneously a plurality of readings derived from a single reading to a remote point.

Yet another object of the invention is to convey a reading to a remote point at a higher rate of movement than the rate of movement of the reading indicator.

Other objects and structural details will be apparent from the following description when read in connection with the accompanying drawings, wherein Fig. 1 is a side view partly in section of the device of the invention;

Fig. 2 is a view in vertical section of the windings and vane mechanism of the device of the invention;

Fig. 3 is a wiring diagram of the coils of the device of the invention;

Fig. 4 is a side view in section of the frame member of the device with the primary coil in place;

Fig. 5 is a top view of the frame member of the device;

Fig. 6 is a side view partly in section of an alternative embodiment of the invention adapted to convey both sensitive pointer reading and range pointer reading to a remote point under the control of a sensitive pointer only;

Fig. 7 is a diagrammatic view of an alternative embodiment of the invention for increasing the accuracy of reading of the remote pointer;

Fig. 8 is a side view partly in section of still another embodiment of the invention adapted to provide both range and sensitive pointer readings at a remote point from the readings of a sensitive pointer only; and Fig. 9 is a front view of an instrument having a pointer adapted to cooperate with the device of the invention for the conveyance of readings to a remote point.

Referring to the figures, particularly Figs. 1 to 5 inclusive and 9, the device of the invention preferably consists of a molded material bobbin member or body 1, as is particularly well shown in Figs. 2, 4 and 5. At opposite ends of the bobbin member 1 there are attached bearing plate members 2 and 3, as is particularly well shown in Figs. 1 and 2. The respective bearing plates 2 and 3 have central jewel bearings 4 and 5, within which is mounted a spindle member 6. The central portion of the spindle member 6 has an enlarged magnetic core member 7, at opposite ends of which there are attached narrow vane members 8 and 9. The end plates 2 and 3 are conveniently held in position on the bobbin member 1 by bolts 11 and form a casing with a metal ring or sleeve 12 enclosing the bobbin or body 1.

The body 1 comprises a tubular center portion 13 defining a central axis and flaring out into flanges 14 and 14' at either end. The rims of the flanges are provided with a plurality of notches arranged in groups. In the illustrated embodiment each group comprises six notches. A first pair of groups of notches 17 is arranged on diametrically opposite sides of the central axis, while a second pair of groups of notches 19 is disposed at right angles relatively to the first pair. A pair of covers 27 and 28 may be inserted into the flanges 14 and 14' forming chambers with the flanges for the vanes 8 and 9 of the rotatable armature.

A primary coil 15 is wound upon the tubular center portion 13 of the bobbin or body 1 concentric with, or coaxial with, the magnetic member 7, as is particularly well shown in Figs. 2, 3 and 4. A first secondary coil 16 is wound upon the bobbin 1, as shown in Figs. 2 and 3. This coil may conveniently be divided up into sections in the notches 17 as shown in Fig. 5. This coil, as shown, has its axis at right angles to the axis of the coil 15. Another secondary coil 18 is similarly wound upon the bobbin member 1 conveniently divided into sections positioned within the notches 19, as shown in Fig. 5. This coil, as shown, has its axis at right angles to the axes of the coil 15 and 16. At one end of the spindle 6 there may be attached a fork member 21 adapted to interconnection with a pointer 22 upon the spindle 23 of an indicating instrument 24, which has a dial 20, as shown in Figs. 1 and 9 for the transmitter; or the spindle 6 may have a repeater point 25 mounted thereon for the repeater, as shown in Fig. 2.

The instrument 24 may be practically any type of indicating instrument in which the instrument torque is sufficient to overcome the bearing friction in the jewel bearings 4 and 5 of the transmission mechanism, and since this friction is quite low the instrument 24 may be a sensitive altimeter, or may be an engine speed indicator, or may be a thermometer pointer, or may be a voltmeter, ammeter, wattmeter or other indicating instrument. The various transmitter and repeater members are interconnected by a cable member 26 in which the appropriate electric circuits are provided, as shown in Fig. 3.

The device of the invention is energized by an alternating current of convenient voltage. This current is preferably of a reasonably pure sine wave and may be taken from the ordinary 60 cycle power circuits or may be provided from other sources such as a vacuum tube oscillator or other source of alternating or pulsating current, in the latter instance a transformer being interposed between the source and the transmission mechanism, if desired.

As shown in Fig. 3, the circuit may conveniently consist of a lead wire 31 from one terminal of the power supply, from which leads 32 and 33 run to the respective primary coils 15 of the several transmitters and repeaters in parallel. A lead wire 34 connects the second terminals of the several primary coils 15 in parallel to a lead wire 35 to which the secondary coils 16 and 18 are connected in parallel by lead wires 36 and 37. The respective second terminals of the coils 16 and 18 of the repeater instrument are series-connected by leads 38 and 39 to the respective secondary coils 16 and 18 of the transmitter member. The second terminals of the transmitter coils 16 and 18 are connected by leads 41 and 42 in parallel to the lead 43 which in turn is connected to the second terminal of the power source. Thus there are parallel circuits through the respective secondary coils of the various transmission units, which parallel circuits in turn are serially connected to a circuit formed of the parallel connected primary coils. These respective coil structures each provides a complex field form, which, in the absence of magnetic metal, is symmetrical. The presence of the member 7 and the attached vanes 8 and 9, however, causes a distortion of the field form, which modifies the field contours and impedance of the respective coils 16 and 18, thereby modifying the current flow therethrough. The modification of current flow in the transmitter coils causes a corresponding change in current flow in the coils 16 and 18 of the repeater member, resulting in a corresponding dissymmetry of field form, which in turn causes the vanes 8 and 9 of the repeater member to move into coincidence with the axis of maximum field strength, which position corresponds to the position of the vanes 8 and 9 of the transmitter member. Thus, the pointer 25 on the repeater member is caused to assume a position corresponding to the position of the fork member 21 and pointer 22 of the transmitter member, thereby conveying the indications of the pointer 22 to the desired remote point at which the pointer 25 is located. The pointer 25 moves over an appropriate graduated scale corresponding to the scale required by the pointer 22 for its indications.

The device is preferably operated, as above pointed out, on alternating current, although while the repeater will operate equally well upon direct current, the transmitter operates best with alternating current. It will be observed that the primary winding 15 which lies within the two secondary coils has its axis at right angles to both of the coils and therefore the magnetic coupling between primary and secondary coils, in the absence of the vane system, is as near zero as possible. However, the presence of the movable vane system provides a magnetic path of low reluctance which conveys the flux to a definite coupling with either or both of the secondary coils. This arrangement, depending upon the position of the vane system, provides a coupling with either coil which may be in such a sense as to oppose, or to reinforce, the currents flowing in either coil because of the series-connection between the parallel group of secondary coils and the parallel group of primary coils.

Accordingly, one coil may have a sufficient opposing voltage induced in it in the transmitter to reduce the current in one secondary coil circuit nearly to zero, forcing all of the current into the other coil and thereby setting the repeater vane in a corresponding position. Other positions of the input transmitter vane will produce other relationships of current flow between the two secondary coils, thereby bringing the repeater vane into corresponding position.

It is to be observed that the alternating character of the field in the respective transmission members results in a minimum of "magnetic friction." That is, there is a minimum of tendency for the lines of magnetic force produced by the various coils to hold the vane members and the rotor structure as a whole in any given position, and therefore substantially the only friction load imposed upon the pointer 22 by the attached transmitter member is the friction load of the bearings 4 and 5. In the present instance the bobbin or body structure as shown in Figs. 4 and 5 may have a height of less than an inch and a diameter only slightly greater than an inch, and accordingly the vane and rotor system may have a weight of a relatively few grains. In consequence of this fact the bearing friction is very small.

Furthermore, the vibration of the magnetic fields in the device permits a creeping effect of the rotor assemblage which permits the fork 21 to assume the position of the pointer 22 with a minimum deviation from the position which it would assume in the absence of the transmitter device. Similarly, in the repeater the friction load is light and the vibration permits of a similar creeping effect and in consequence it is readily possible to obtain an accuracy of coincidence of reading between the pointer 22 and the pointer 25 which is better than 1½ degrees, an amount too small for perceptible reading under ordinary instrument conditions, and an amount which, on a scale adapted to one complete rotation, amounts to less than ¾ of 1% error, which is a higher degree of accuracy than is obtainable from most indicating instruments.

The accuracy with which the repeater vane assumes a position corresponding to the position of the transmitter is in large measure determined by the exactitude of the similarity between the transmitter and the repeater, since the accuracy of reproduction is dependent upon the production of closely similar field distributions in the respective structures. Previously constructed repeater systems such as that shown in Patent No. 1,431,627, have failed to realize the necessity for this accuracy and have used merely slotted magnetic material frames, which produce a highly undesirable magnetic distortion at the teeth of the slotted structure, causing the control and indicator vanes to move in successive jumps. A substantial portion of the present invention lies in the use of an accurately molded insulating material bobbin or body of very carefully exact dimensions and form. The use of a single mold for all of the transmitter bobbins results in a high degree of repeated form accuracy, and the use of accurately counted coil turns in the respective slots provides a high degree of electrical accuracy, which are the basic factors making possible the high degree of accuracy of repetition above mentioned. The avoidance of the iron core greatly reduces the impedance of the coils and reduces the amount of coupling between the primary coil and the respective secondary coils to such an extent that ordinary types of construction do not provide sufficient accuracy of shape and electrical constants to provide a satisfactory instrument. However, it is found in the present embodiment that by the use of the very accurately molded bobbins of such materials as polymerized resins of the type of Bakelite, of low electrical loss characteristics, and very accurately counted coil sizes, both the mechanical and electrical characteristics are so accurately reproducible as to obtain the desired accuracy of operation of the repeater device.

More than one repeater may be actuated from a single transmitter, and for this reason leads 44 and 45 are shown in Fig. 3 to indicate the connection for a second repeater. In some instances all of the units may be identical in structure and winding characteristics; or in other instances the repeaters may have different impedances from the transmitter in order that the combined impedances of the repeaters may equal the impedance of the transmitter, which is the criterion for maximum efficiency and accuracy of transmission.

As above pointed out, several repeaters may be operated from a single transmitter. Alternatively, several transmission systems may be operated side by side for the conveyance of a reading.

As shown in Fig. 6, two transmitters 51 and 52 may be driven simultaneously from a single indicating instrument 53. The instrument 53, for instance, an engine speed or revolution indicator, may have a pointer 54 which rotates the fork 21 on the first transmitter 51, and through the gearing 55 operates the second transmitter 52. A convenient ratio for the gearing 55 is 10 to 1, and accordingly the pointer 54, which may be a sensitive pointer and may make several complete revolutions in going from zero to a reading, will drive the transmitter 51 through a succession of revolutions. The control current modifications from the transmitter 51 are conveyed through the cable 56 to the repeater 57, which, through the gear train 58, operates the sensitive repeater pointer 59 through a corresponding number of complete revolutions. Simultaneously, the transmitter 52 is driven at a lower rotational rate and the output control currents from it are conveyed by the cable 61 to the repeater 62, which in turn drives the range pointer 63.

This embodiment of the invention is particularly advantageous for the transmission to the remote point of readings of a character requiring two pointers, such as the readings of a sensitive altimeter equipped with sensitive pointer and range pointer operating on the same scale and dial; or for the transmission of readings from an engine speed indicator of the sensitive type, in which the actual readings require two pointers, one a sensitive pointer indicating perhaps a speed change of 1000 revolutions per minute for a complete swing of the pointer around the 360 degree scale and a second pointer reading in terms of a change of 10,000 revolutions per minute for one swing of the pointer through the 360 degrees of the scale. This instrument is particularly advantageous because of the fact that the respective sensitive pointer and range pointer readings are independently conveyed from the indicator to the remote dial, and accordingly, if the power for the transmitter is disconnected and the reading of the instrument changes, reconnection of the power to the transmitter cannot result in an incorrect reading, since the range pointer will assume a position corresponding to the position of the sensitive transmitter without regard to the number of revolutions that either have been caused to make during the time the power supply was disconnected from the transmitter system.

In some instances the small amount of error present in the repeater dial due to lag of the rotor and vane system is objectionable. This lag may be greatly reduced by the embodiment shown in Fig. 7, in which a gear member 61 is mounted upon the indicating instrument spindle 62 in place of the usual pointer and meshed with a gear 63 on the spindle 6 of the input transmitter. The ratio between the gears 61 and 63 may be made as desired and may conveniently be either 5 to 1 and 10 to 1. In consequence, the vane and rotor system on the transmitter spindle 6 will make several complete revolutions for one revolution of the instrument spindle 62, and accordingly the repeater spindle 6 will make a corresponding number of revolutions. The gear 64 upon the repeater spindle 6 makes a similar number of revolutions and causes the larger gear 65 with which it meshes to make a number of revolutions determined by the ratio between the gears 64 and 65. This gear ratio may be the same as the ratio between the gears 61 and 63, or may be different. If the respective gear ratios are the same, the angular lag of the pointer 66 operated by the gear 65 is reduced from the lag incident to the transmitting system by an amount proportional to the ratio between the drive ratio of the respective pairs of gears. Thus, if the angular lag of the transmitter mechanisms is 1½ degrees and the gear ratio is 5 to 1, the lag of the pointer 66 is one-fifth of 1½ degrees, or 0.3 degree, or 18 minutes of arc. Similarly, if the gear ratios in the transmitters and repeaters are different, a different scale character is obtained in which also the angular accuracy may be greatly improved and in which the different scale character may provide more satisfactory reading conditions.

In some instances it is desired to obtain a remote indication in terms both of a sensitive pointer and a range pointer from an instrument which has only a range pointer, such, for instance, as the ordinary engine speed indicator, or the ordinary temperature indicator, or the ordinary single pointer altimeter. Most of these instruments have highly accurate operating mechanisms but are not adapted to extremely close reading because of the wide scale range which is required. The embodiment of Fig. 8 is particularly advantageous for this purpose. The ordinary single pointer instrument 71, such as an engine speed indicator, may have attached thereto a transmitter member 72 constructed and connected as shown in Figs. 1, 2 and 3, the transmitter 72 having a similar fork member 21 co-operating with the instrument pointer 22 mounted upon the instrument spindle 23. The transmission currents are conveyed through the cable 26 to the remote indicator 73 having the repeater 74 connected to a range indicating pointer 75. The range indicating pointer 75 thus takes a position corresponding to the instrument pointer 22 and is easily read for the indication range. In addition, a step-up gear set 76 is likewise provided and connected to a sensitive pointer 77. The scale graduations 20 may conveniently consist of ten major divisions for the 360 degrees of the scale circle, and the step-up ratio of the gears 76 may conveniently be 10 to 1. With this arrangement, movement of the range pointer over one major division of the scale results in a complete rotation of the sensitive pointer 77 over ten divisions of the scale. Thus, if the trasmission is of engine revolutions, the range pointer may indicate thousands of revolutions per major division, and the sensitive pointer may indicate hundreds of revolutions per major division, and the major divisions may be subdivided into five minor divisions. By this arrangement, the range pointer may be read in terms of thousands of revolutions per minute and the sensitive pointer may be read in terms of hundreds of revolutions and twenties of revolutions per minute, and by interpolation the sensitive pointer may be read in terms of tens of revolutions per minute.

Alternatively, where the reading of the range pointer is not too critical and the instrument pointer is a sensitive pointer, the gear set 76 may have a step-down ratio to provide a range pointer driven from the sensitive pointer. In the event that this arrangement is used, however, it is necessary that means be provided for insuring the setting of the range pointer, since if the power supply is disconnected from the transmitter system and the sensitive pointer of the instrument moves by a whole revolution or more during the time that the power is disconnected, the repeater may read in error by one or more major divisions of the range pointer.

The device of the invention thus provides a simple, accurate, inexpensive and light-weight pointer repeater system adapted to cooperation with indicating instrument pointers for the transfer of the pointer reading to a remote point with a high degree of accuracy; and to the modification and alteration of the character of indicator scale utilized.

While there are above disclosed but a limited number of embodiments of the device of the invention, it is possible to produce still other embodiments without departing from the inventive concept herein disclosed, and it is therefore desired that only such limitations be imposed upon the appended claims as are stated therein or required by the prior art.

What we claim and desire to secure by United States Letters Patent is:

1. A remote transmission unit comprising, in combination, a metal ring; a pair of bearing plates completing said ring to form a cylindrical casing having a central axis; an insulating body in said casing having a tubular center portion co-axial with said central axis, said center portion flaring out into flanges at either end, the rims of the flanges being provided with notches arranged in groups, two groups forming a first pair arranged on diametrically opposite sides of the central axis, and two groups forming a second pair disposed at right angles relatively to said first pair; a primary winding on said center portion; a first and a second secondary winding in said first and said second pair of groups of notches, respectively, whereby said primary and said first and said second secondary windings are disposed at right angles to each other; a cover associated with each of said flanges forming a circular chamber with the respective flange below the secondary windings; and an armature supported by said bearing plates for rotation co-axially with said central axis, said armature comprising a magnetic sleeve extending through said tubular center portion and a pair of magnetic vanes extending radially and in opposite directions from said sleeve on opposite sides of said flanges into said chambers.

2. A remote transmission unit comprising, in combination, a metal ring; a pair of bearing plates completing said ring to form a cylindrical casing having a central axis; an insulating body in said casing having a tubular center portion co-axial with said central axis, said center portion flaring out into flanges at either end, the rims of the flanges being provided with notches arranged in groups, two groups forming a first pair arranged on diametrically opposite sides of the central axis, and two groups forming a second pair disposed at right angles relatively to said first pair; a primary winding on said center portion; a first and a second secondary winding in said first and said second pair of groups of notches, respectively, whereby said primary and said first and said second secondary windings are disposed at right angles to each other; and an armature supported by said bearing plates for rotation co-axially with said central axis, said armature comprising a magnetic sleeve extending through said tubular center portion, and a pair of magnetic vanes extending radially and in opposite directions from said sleeve on opposite sides of said flanges to rotate in the space between said flanges and said secondary windings.

3. In a remote transmission unit, an insulating molded body of resinous material having a tubular center portion defining a central axis, said center portion flaring out into flanges at either end, the rims of the flanges being provided with notches arranged in groups, two groups forming a first pair arranged on diametrically opposite sides of the central axis, and two groups forming a second pair disposed at right angles relatively to said first pair; a primary winding on said center portion; a first and a second secondary winding in said first and said second pair of groups of notches, respectively, whereby said primary and said first and said second secondary windings are disposed at right angles to each other; a cover associated with each of said flanges forming a circular chamber with the respective flange below the secondary windings; and an armature supported for rotation co-axially with said central axis, said armature comprising a magnetic sleeve extending through said tubular center portion and a pair of magnetic vanes extending radially and in opposite directions from said sleeve on opposite sides of said flanges into said chamber.

4. In a remote transmission unit, an insulating molded body of resinous material having a tubular center portion defining a central axis, said center portion flaring out into flanges at either end, the rims of the flanges being provided with notches arranged in groups, two groups forming a first pair arranged on diametrically opposite sides of the central axis, and two groups forming a second pair disposed at right angles relatively to said first pair; a primary winding on said center portion; a first and a second secondary winding in said first and said second pair of groups of notches, respectively, whereby said primary and said first and said second secondary windings are disposed at right angles to each other; and an armature mounted for rotation co-axially with said central axis, said armature comprising a magnetic sleeve extending through said tubular center portion, and a pair of magnetic vanes extending radially and in opposite directions from said sleeve on opposite sides of said flanges to rotate in the space between said flanges and said secondary windings.

5. An article of manufacture, an insulating body for supporting a plurality of windings, said body having a tubular center portion defining a central axis, said center portion flaring out into cup-shaped flanges at either end, the rims of the flanges being provided with notches arranged in groups, two groups forming a first pair arranged on diametrically opposite sides of said central axis, and two groups forming a second pair disposed at right angles relatively to said first pair.

6. In a remote transmission unit, an insulating molded body, said body comprising four co-axial circular and parallel wall members, two having a smaller and two having a larger diameter, the inner wall members being connected by a tubular center portion defining a central axis, the rims of the larger wall members being provided with notches arranged in groups, two groups forming a first pair arranged on diametrically opposite sides of the central axis, and two groups forming a second pair disposed at right angles relatively to said first pair; a primary winding on said center portion; a first and a second secondary winding in said first and said second pair of groups of notches, respectively, whereby said primary and said first and said second secondary windings are disposed at right angles to each other; and an armature supported for rotation co-axially with said central axis, said armature comprising a magnetic sleeve extending through said tubular center portion and a pair of magnetic vanes extending radially and in opposite directions from said sleeve on opposite sides of said inner wall members into the space between said inner and said outer wall members.

PAUL KOLLSMAN.
VICTOR E. CARBONARA.